United States Patent [19]

Sakoh et al.

[11] Patent Number: 5,453,677
[45] Date of Patent: Sep. 26, 1995

[54] BATTERY CHARGER WITH HIGH SENSITIVITY

[75] Inventors: Masahiko Sakoh; Tatsuki Mori, both of Anjo, Japan

[73] Assignee: Makita Corporation, Anjo, Japan

[21] Appl. No.: 418,425

[22] Filed: Apr. 7, 1995

[30] Foreign Application Priority Data

Apr. 7, 1994 [JP] Japan .................................. 6-069476

[51] Int. Cl.⁶ ...................................................... H02J 7/10
[52] U.S. Cl. ................................................ 320/39; 320/22
[58] Field of Search ................................. 320/15, 22, 23, 320/24, 30, 31, 32, 39, 40; 323/353, 354

[56] References Cited

U.S. PATENT DOCUMENTS

| | | | |
|---|---|---|---|
| 3,912,108 | 10/1975 | Clayton et al. | 320/39 |
| 3,921,051 | 11/1975 | Ballman | 320/39 |
| 4,006,396 | 2/1977 | Bogut | 320/22 X |
| 5,264,777 | 11/1993 | Smead | 320/15 X |
| 5,420,493 | 5/1995 | Hargadon et al. | 320/15 |

*Primary Examiner*—Peter S. Wong
*Assistant Examiner*—Y. Jessica Han
*Attorney, Agent, or Firm*—Dennison, Meserole, Pollack & Scheiner

[57] ABSTRACT

A battery charger includes a battery voltage detecting circuit for detecting a voltage of a battery during a charging operation. The battery voltage detecting circuit includes a pair of a first and a second voltage-dividing resistor. A transistor is interposed between the first and second voltage-dividing resistors. A predetermined voltage is applied to the base of the transistor, so that the battery voltage is detected based on the voltage divided by the first and second voltage-dividing resistors.

4 Claims, 6 Drawing Sheets

BATTERY CHARGER WITH HIGH SENSITIVITY

BACKGROUND OF THE INVENTION

1. Field of the Invention

The present invention relates to a battery charger and particularly to a battery charger which includes a circuit for detecting a battery voltage during a charging operation and which is operable to perform a control for stopping supply of a charging current based on the detected battery voltage.

2. Description of the Prior Art

Figure 5:
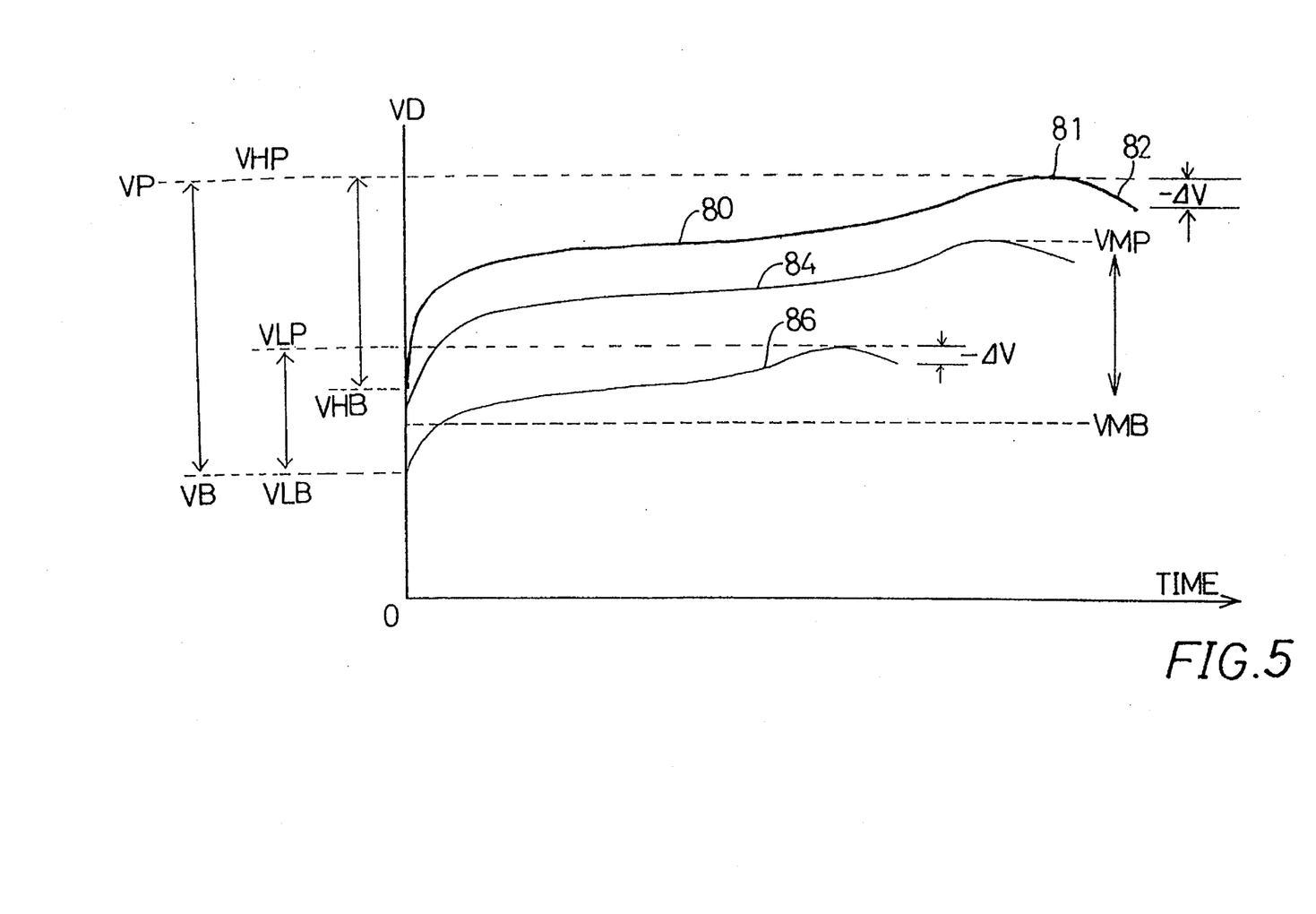
FIG. 5 is a graph showing the variation in the battery voltage during a charging operation.

Generally, when a battery is charged, a battery voltage increases with the proceeding of charge as will been seen from a characteristic line 80 shown in FIG. 5. The battery voltage becomes maximum when the battery has been fully charged as indicated by a point 81 in FIG. 5. When the charging operation is further continued, the battery voltage is decreased as a line part 82. Such a characteristic is utilized to stop the supply of the charging current when the battery has been fully charged, and a method called "–ΔV method" is well known.

With the –ΔV method, the battery voltage is detected during the charging operation so as to determine the timing when the battery voltage has been decreased by a voltage of –ΔV from a peak voltage, and the charging operation is stopped at this timing. In order to ensure that this method is reliably performed, it is necessary to exactly detect the battery voltage.

Figure 6A:
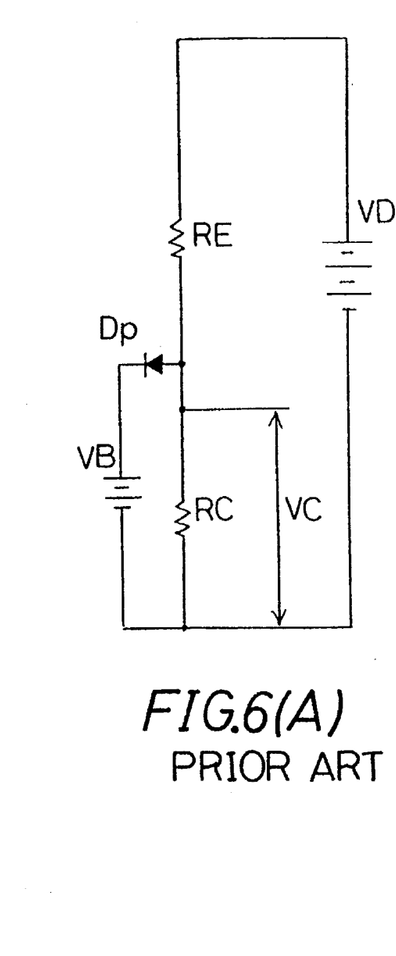
FIGS. 6(A) and 6(B) are circuit configurations of prior art battery voltage detecting circuit.

FIG. 6(A) shows a circuit configuration which is normally used for detecting a battery voltage VD. In FIG. 6(A), the battery voltage VD is divided by a pair of resisters RE and RC to obtain a divided voltage VC based on which the battery voltage VD is determined. Thus, in this circuit, the battery voltage VD is proportional to the divided voltage VC as a characteristic line Ap shown in FIG. 6(C). Here, a diode Dp and a constant voltage VB serve to prevent the divided voltage VC from having a value more than the voltage VB.

As shown in FIG. 5, the battery voltage VD is never reduced to zero but maintains a value equal to or greater than a certain value even if the battery is one to be recharged. When the battery is charged, the battery voltage VD increases from such a value equal to or greater than the certain value. The characteristic line 80 shown in FIG. 5 is that obtained in case of charging of a battery having a higher rating voltage. In this case, the battery voltage varies within a range between a voltage VHB and a voltage VHP. A characteristic line 84 is obtained in case of charging of a battery having a middle rating voltage, and a characteristic line 86 is obtained in case of a battery having a lower rating voltage. Voltages VHB, VMB and VLB correspond to the base voltage for the batteries having the higher, the middle and the lower rating voltages, respectively, and voltages VHP, VMP and VLP correspond to the peak voltage for the batteries having the higher, the middle and the lower rating voltages, respectively. When these three kinds of batteries are to be charged by a common battery charger, the battery charger should include a circuit for detecting the battery voltage between VB(VLB) and VP(VHP).

Figure 6B:
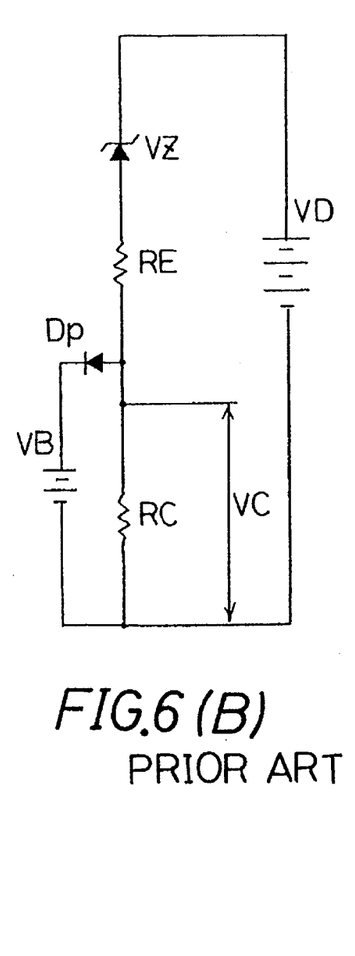
Figure 6C:
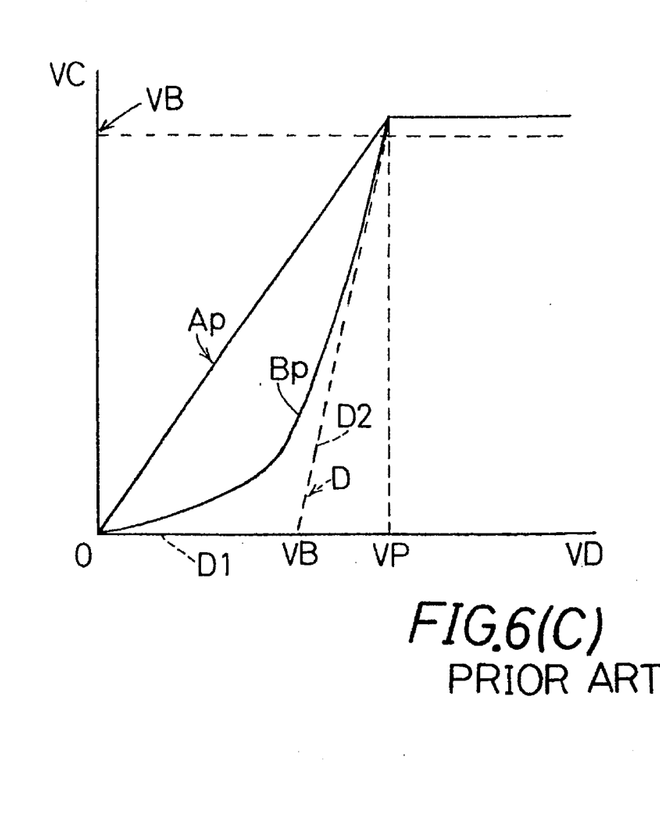
FIG. 6(C) is a graph showing the characteristic lines obtained by the circuits of FIGS. 6(A) and 6(B).

It is preferable that the divided voltage VC varies by a greater extent in response to the variation of the battery voltage between VB and VP or varies along a line such as a characteristic line D (line part D1+line part D2) shown in FIG. 6(C).

In order to vary the characteristic line Ap shown in FIG. 6(C) to approach the characteristic line D (D1+D2), another circuit is proposed as shown in FIG. 6(B). In this circuit, a zener diode VZ having a breakdown voltage equal to VB is incorporated, so that the divided voltage VC is zero when the battery voltage VD is lower than the voltage VB. On the other hand, when the battery voltage VD is greater than the voltage VB, the current flows across the zener diode VZ and the resistor RC resulting in increase in the divided voltage VC.

With the latter circuit, however, the current flows across the zener diode VZ even if the battery voltage VD is lower than the breakdown voltage VB. For this reason, the divided voltage VC varies with the battery voltage VD as a characteristic line Bp shown in FIG. 6(C). Therefore, the latter circuit is not sufficient to cope with the requirement of the greater variation of the divided voltage VC in response to the variation in the battery voltage between VB and VP. Particularly, in case of charging of a battery having battery cells connected in series with each other, although the battery voltage has a value between VB and VP in a normal condition of the battery, the battery voltage may have a value lower than VB when any one of the battery cells is shorted. Further, in this case, if the characteristic line D is obtained, it is easy to detect the short circuit of the battery cell since the divided voltage VC is zero. On the other hand, if the characteristic line Bp is obtained, the divided voltage VC is not zero, so that it is difficult to detect the short circuit. Thus, the characteristic line Bp is still not sufficient although it improves the sensitivity of detection to some extent compared with the characteristic line Ap.

The present invention is therefore intended to obtain the characteristic of the divided voltage to vary substantially along the characteristic line D so as to dissolve the disadvantage of the conventional battery charger.

SUMMARY OF THE INVENTION

It is, accordingly, an object of the present invention to provide a battery charger which is operable to easily detect a shorted condition of a battery.

It is another object of the present invention to provide a battery charger which improves the sensitivity of detection of a battery voltage.

It is a further object of the present invention to provide a battery charger which is operable to exactly detect a timing of full charging of a battery.

It is a still further object of the present invention to provide a battery charger which is operable to reliably prevent a battery from short charge or excessive charge so as to ensure a long period of service of the battery.

According to the prevent invention, there is provided a battery charger comprising a battery voltage detecting circuit for detecting a voltage of a battery during a charging operation, the battery voltage detecting circuit including a pair of a first and a second voltage-dividing resistor, and a transistor interposed between the first and second voltage-dividing resistors, the base of the transistor being applied by a predetermined voltage, so that the battery voltage is detected based on the voltage divided by the first and second voltage-dividing resistors.

With the present invention, since the predetermined voltage VB is applied to the base of the transistor, no current flows between the emitter and the collector of the transistor, so that the divided voltage VC is zero when the battery voltage VD is lower than the base voltage VB. Thus, the line D1 in FIG. 6(C) is obtained in this case. When the battery voltage VD is equal to or greater than the base voltage VB, the current begins to flow between the emitter and the collector of the transistor, and the value of the current is proportional to the difference between the battery voltage VD and the base voltage VB. Consequently, the line D2 shown in FIG. 6(C) can be obtained. Thus, with the present invention, the characteristic lines D1 and D2 are obtained to indicate that the divided voltage VD is zero when the battery voltage VD is less than the base voltage VB, and to indicate that the divided voltage VD varies by a great extent in response to the variation in the battery voltage between VB and VP, respectively.

Preferably, between an earthing line and a connecting point which connects the transistor to the first voltage dividing resistor, a bypass resistor is connected for bypassing the transistor and the second voltage-dividing resistor.

With this construction, the value of the battery voltage VD at which the divided voltage VC starts to increase can be adjusted by adjusting the value of the bypass resistor, so that a characteristic suitable to the battery to be charged can be easily realized.

In this case, it is also preferable that the bypass resistor includes a plural number of bypass resistor elements which are connected in parallel to each other and that a first switch is connected between the earthing line and each of the bypass resistor elements. With this construction, a suitable bypass resistor element or elements can be selected through control of the first switch, so that the relationship between the battery voltage VD and the divided voltage VC can be selectively determined.

In addition, it is further preferable that the second voltage dividing resistor connected between the transistor and the earthing line includes a plurality of voltage-dividing resistor elements connected in parallel to each other and that a second switch is connected between each of the voltage-dividing resistor elements and the earthing line. With this construction, a suitable voltage-dividing resistor element or elements can be selected through control of the second switch, so that the relationship between the battery voltage VD and the divided voltage VC can be selectively determined.

The invention will become more apparent from the appended claims and the description as it proceeds in connection with the drawings.

DETAILED DESCRIPTION OF THE PREFERRED EMBODIMENT

An embodiment of the present invention will now be explained with reference to the accompanying drawings.

Figure 1:
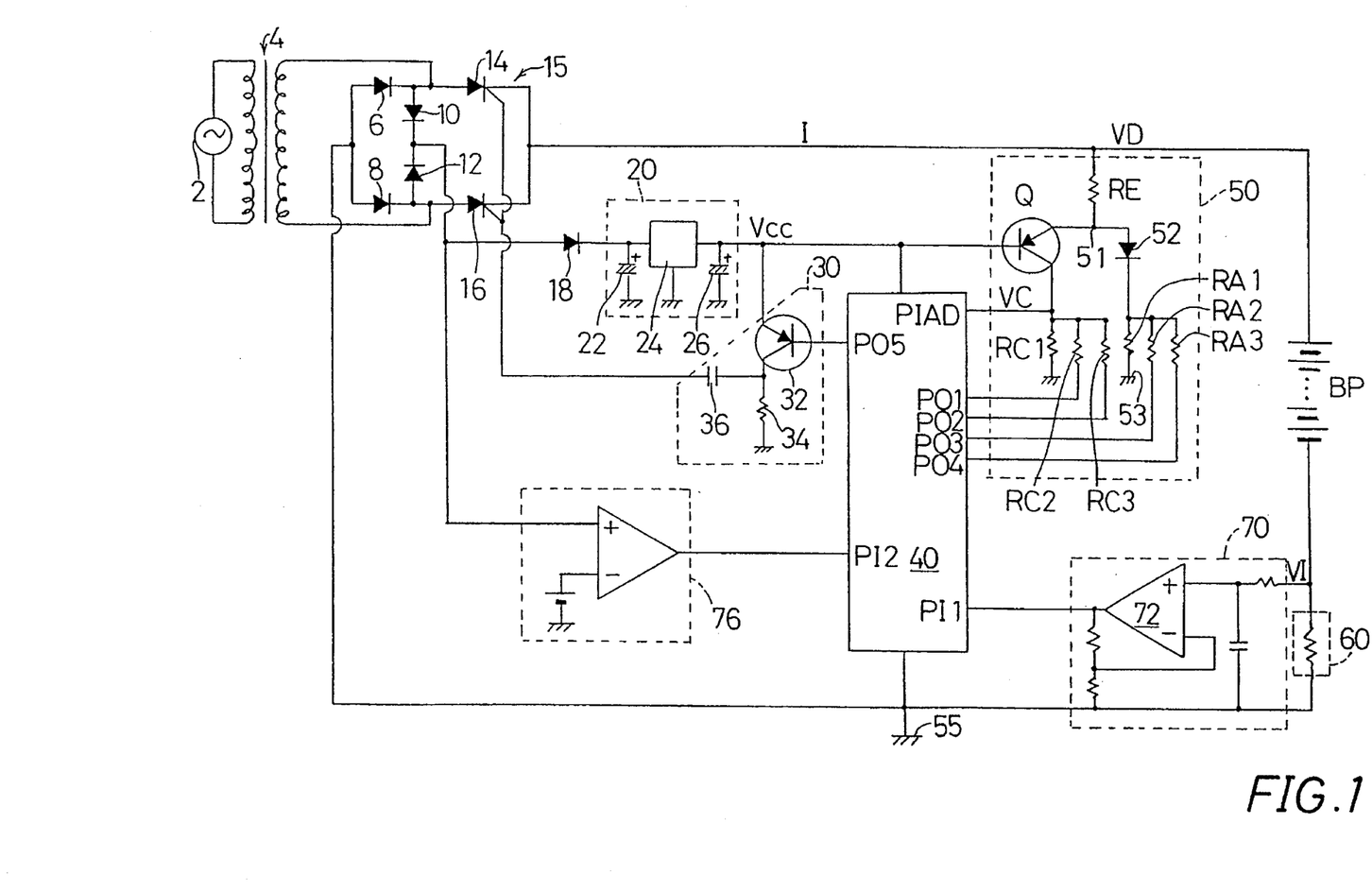
FIG. 1 is a circuit configuration of a battery charger according to an embodiment of the present invention.

Referring to FIG. 1, there is shown a battery charger which is operable to charge three kinds of batteries having different rating voltages. Power supplied from a commercial AC power source 2 is dropped by a transformer 4 and is rectified by a bridge 15 including diodes 6 and 8 and thyristors 14 and 16. Thus, a charging current I is rectified by the bridge 15 and is adjusted in firing angle at the thyristors 14 and 16. The charging current I is then supplied to a battery BP so as to charge the same. The amplitude of the charging current I is detected by a shunt resistor 60. The charging current I is converted into a voltage V1 and is amplified by a voltage amplifying circuit 70 which consists mainly of an operational amplifier 72. The value of the charging current I is then supplied to a one-chip microcomputer 40. Here, the firing angles at the thyristors 14 and 16 are controlled by the microcomputer 40 in response to the value of the charging current I, so that the charging current I is maintained at a constant value.

Diodes 10 and 12 cooperate with the diodes 6 and 8 to form a bridge for taking out voltage for control purpose. The voltage rectified by the bridge comprising the diodes 6, 8, 10 and 12 is converted into a constant voltage Vcc by a constant voltage circuit 20 including capacitors 22 and 26 and a voltage regulator 24. The constant voltage Vcc is used as a power-source voltage for a transistor 32, a transistor Q, the microcomputer 40 and the operational amplifier 72. The transistors 32 and Q will be explained later.

The microcomputer 40 has a CPU, a ROM, a RAM, input ports PIAD, PI1 and PI2, output ports PO1 to PO5 and an A/D converter which are assembled into one chip construction. The input port PIAD receives the voltage VC which corresponds to a battery voltage VD of the battery BP. The input port PI1 receives the value of the charging current I which has been converted into the voltage value as described above. A zero-voltage timing detecting circuit 76 is turned on to output a timing signal when the voltage rectified by the bridge of the diodes 6, 8, 10 and 12 has become zero. The timing signal is then inputted to the input port PI2. The output port PO5 of the microcomputer 40 is connected to a firing signal generating circuit 30 which consists mainly of the transistor 32. More specifically, the output port PO5 is connected to the base of the transistor 32, the emitter of the transistor 32 receives the supply of the constant voltage Vcc, and the collector of the transistor 32 is connected to the gates of the thyristors 14 and 16 through a capacitor 36. The output port PO5 normally outputs a HIGH signal and is switched to output a LOW signal during a short time when the thyristors 14 and 16 are to be fired.

The microcomputer 40 stores a program to adjust the charging current I and performs the following steps according to the stored program:

(1) Receiving the value of the charging current I from the input port PI1.

(2) Detecting the zero-timing from the input of the input port PI2.

(3) Extending the period between the inputted zero-timing and the timing for outputting the LOW signal from the output port PO5 during the short time when the inputted charging signal I is equal to or greater than a predetermined value, and shortening this period when the charging current I is lower than the predetermined value.

When the output port PO5 outputs the HIGH signal, the transistor 32 is held off, so that the thyristors 14 and 16 are not fired. When the output port PO5 is converted to output the LOW signal, the transistor 32 is turned on, so that the thyristors 14 and 16 are fired. As the result of this operation, when the charging current I is too large, the timing of firing is delayed to lower the charging current I. On the other hand, when the charging current I is too small, the timing of firing is advanced to increase the charging current I. Thus, the charging current I during the charging operation is maintained at a constant value.

A battery voltage detecting circuit 50 is operable to produce a divided voltage VC from the battery voltage VD and includes one voltage-dividing resistor RE on one side and a group of three different kinds of voltage-dividing resistors RC1, RC2 and RC3 on the other side. The transistor Q is interposed between the voltage-dividing resistor RE and the group of the voltage-dividing resistors RC1, RC2 and RC3. The constant voltage Vcc is applied to the base of the transistor Q. Three different kinds of bypass resistors RA1, RA2 and RA3 are connected in parallel between earthing lines 53, 55 and a connecting point 51 which connects the transistor Q to the voltage-dividing resistor RE. The voltage-dividing resistor RC2 is connected to the output port PO1, and the voltage-dividing resistor RC3 is connected to the output port PO2. On the other hand, the bypass resistor RA2 is connected to the output port PO3, and the bypass resistor RA3 is connected to the output port PO4. Here, the output ports PO1 to PO4 are normally maintained not to be electrically connected to the earthing line 55 but are connected thereto through operation of the microcomputer 40. Thus, the output ports PO1 to PO4 function as switches between these ports and the earthing line 55. More specifically, the output ports PO3 and PO4 serve as first switches for inhibiting and effectuating the bypassing operation of the bypass resistors RA2 and RA3 when they are turned on and off. The output ports PO1 and PO2 serve as second switches for inhibiting and effectuating the dividing operation of the voltage-dividing resistors RC2 and RC3 when they are turned on and off.

Due to the provision of three kinds of voltage-dividing resistors RC1 to RC3 as well as three kinds of bypass resistors RA1 to RA3, the battery charger of this embodiment can be adapted to charge the batteries BP having three different rating voltages.

Figure 2A:
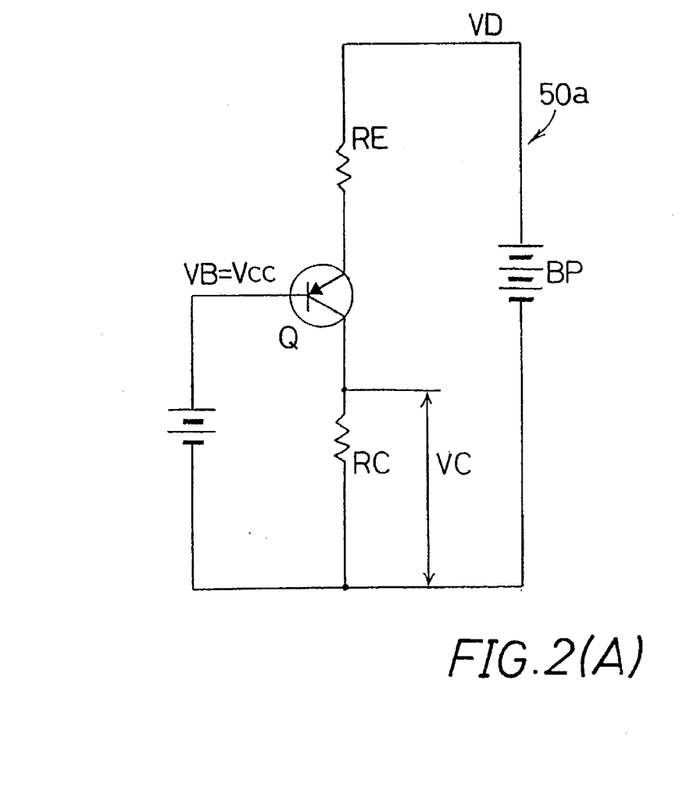
FIG. 2(A) is a first modification of a battery voltage detecting circuit of the circuit shown in FIG. 1.

If the battery charger is adapted to charge the batteries of only one rating voltage, the battery voltage detecting circuit 50 is modified to a circuit 50a shown in FIG. 2(A). In this circuit 50(a), only one voltage-dividing resistor RC is provided on the other side of the voltage-dividing resistor RE, and no bypass resistor is provided.

In case of the circuit 50(a), the base voltage VB is equal to the constant voltage Vcc. When the battery voltage VD is lower than the base voltage VB, or when the battery voltage VD is lower than the value of the base voltage VB in addition to a voltage drop VBE between the base and the emitter of the transistor Q, no current flows between the emitter and the collector, so that the dividing voltage VC becomes zero. Consequently, a characteristic line D3 as shown in FIG. 2(B) is obtained.

When the battery voltage VD is equal to or more than the value of the base voltage VB in addition to the voltage drop VBE, the current flows between the emitter and the collector of the transistor Q. At this stage, although the current flows also between the emitter and the base, the value of this current is about 1/100 times as the current between the emitter and the collector, and therefore, such a current is negligible in a practical operation. Thus, the battery voltage VD is divided by the voltage-dividing resistors RE and RC, and the divided voltage VC is proportional to a value corresponding to the subtraction of the base voltage VB (more specifically, the base voltage VB in addition the voltage drop VBE between the base and the emitter) from the battery voltage VD. Thus, a characteristic line D4 as shown in FIG. 2(B) can be obtained. Here, the ratio of variation in voltage VC relative to the battery voltage VD or the inclination of the line D4 can be adjusted by varying the ratio of the values of the voltage-dividing resistors RC and RE relative to each other. The inclination of the line D4 is reduced as the value of the voltage-dividing resistor RC is lowered.

In this case, the divided voltage VC may vary within a suitable range if the battery voltage at the transient point from the line D3 to the line D4 is determined as VHB in case of charging of a battery having the higher rating voltage and as VLB in case of charging of a battery having the lower rating voltage as shown in FIG. 5.

Figure 2B:
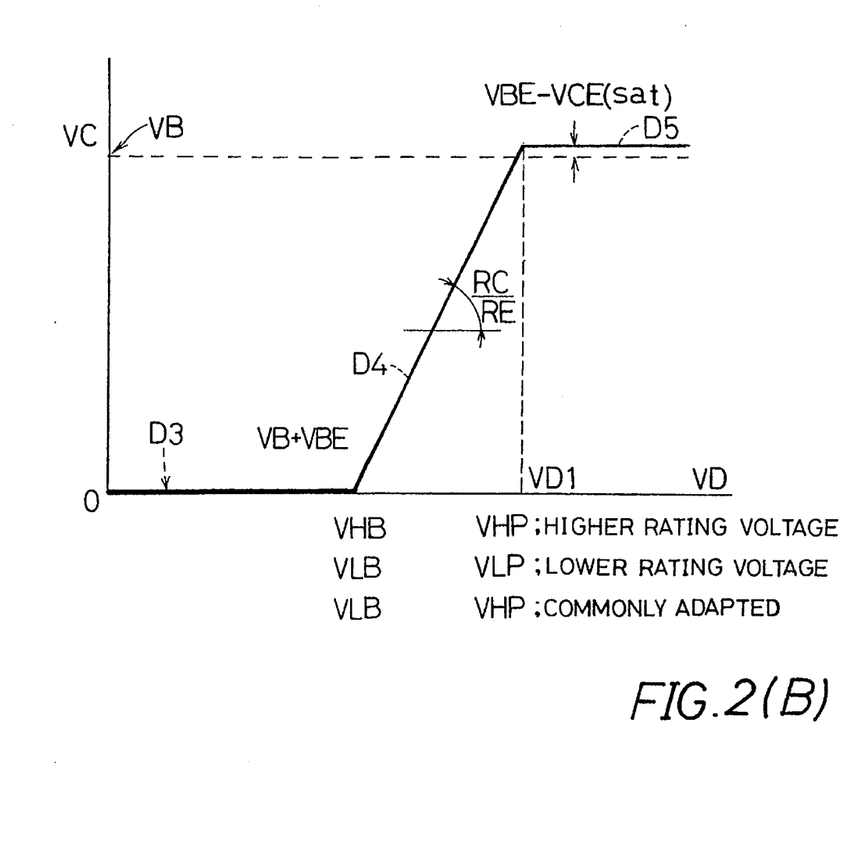
FIG. 2(B) is a graph showing a characteristic line obtained by the circuit of FIG. 2(A)

As will be seen from a line D5 in FIG. 2(B), the divided voltage VC may not absurdly increase or may not have a value more than the base voltage VB. More specifically, the divided voltage VC may not have a value more than the value of the base voltage VB in addition the difference between the voltage drop VBE and a voltage drop VCE(sat). The voltage drop VBE is the drop between the base and the emitter, and the voltage drop VCE(sat) is the drop between the collector and the emitter when the divided voltage VC has been saturated.

The battery voltage VD has a value VDI when the divided voltage VC is saturated. The value VD1 is adjusted to be equal to VHP for the battery of higher rating voltage. For the battery of lower rating voltage, the value VD1 is adjusted to be equal to VLB. With this adjustment, the divided voltage VC may vary by a large extent within an appropriate range required for the battery to be charged.

Further, even if the battery charger is adapted to charge batteries having different rating voltages, the divided voltage VC may be determined to vary between zero and its peak value when the battery voltage VD varies between a possible lowest voltage VLB and a possible highest voltage VHP.

Although the circuit of FIG. 2(A) may provide a substantially excellent result, the battery voltage at which the line D3 is changed to the line D4 in FIG. 2(B) is always equal to the base voltage VB and cannot be varied.

Figure 3A:
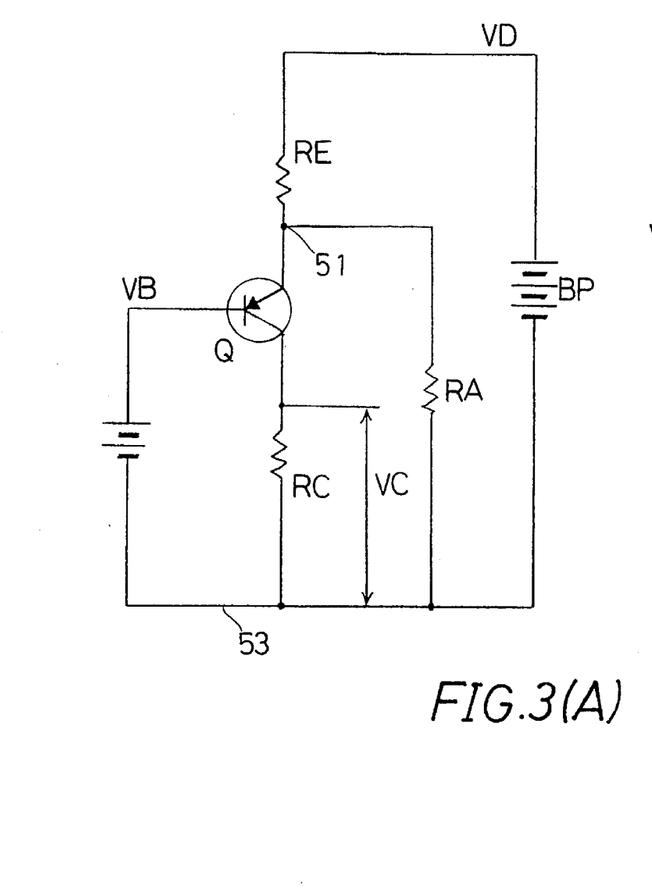
FIG. 3(A) is a second modification of the battery voltage detecting circuit.
Figure 3B:
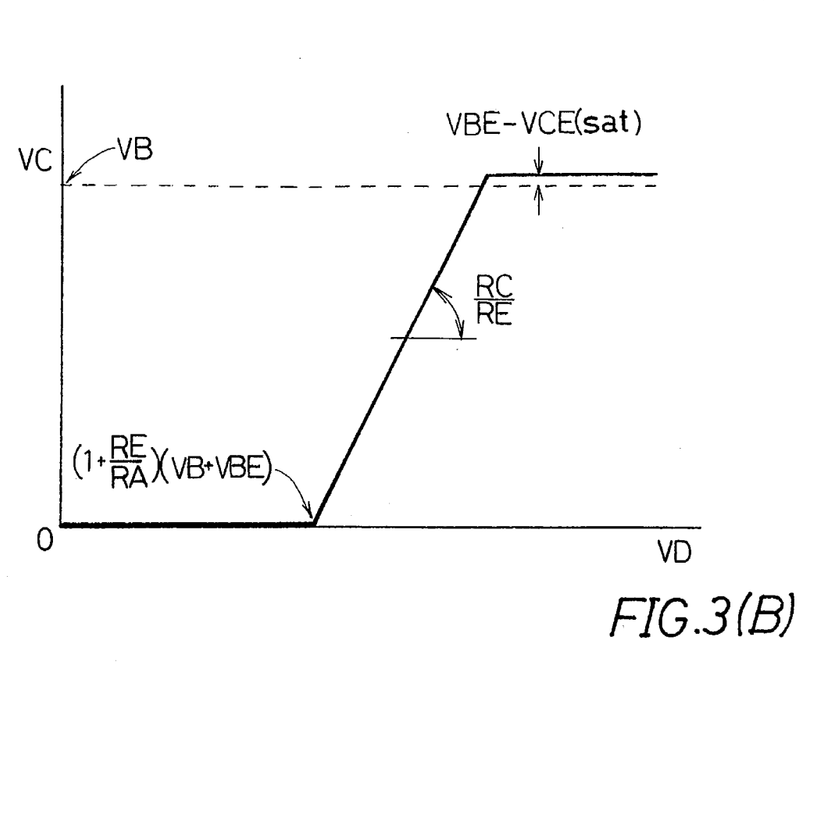
FIG. 3(B) is a graph showing a characteristic line obtained by the circuit of FIG. 3(A)

A circuit shown in FIG. 3(A) is a modification of the circuit 50a of FIG. 2(A) and is operable to overcome this disadvantage. In this circuit, a bypass resistor RA is incorporated between the earthing line 53 and the connecting point 51 which connects the transistor Q to the voltage-dividing resistor RE so as to bypass the transistor Q and the other voltage-dividing resistor RC.

With the configuration of the circuit shown in FIG. 3(A), the value of the battery voltage obtained at which the divided voltage VC is varied from zero is (1+RE/RA) times as the corresponding value obtained from the circuit of FIG. 2(A). Therefore, by varying the value of the bypass resistor RA, the characteristic of the divided voltage VC relative to the battery voltage VD can be varied.

On the other hand, the embodiment shown in FIG. 1 includes three kinds of voltage-dividing resistors RC1, RC2 and RC3 as well as three kinds of bypass resistors RA1, RA2 and RA3. Therefore, by selectively combining these resistors, three characteristic lines A, B and C shown in FIG. 4 can be obtained.

Figure 4:
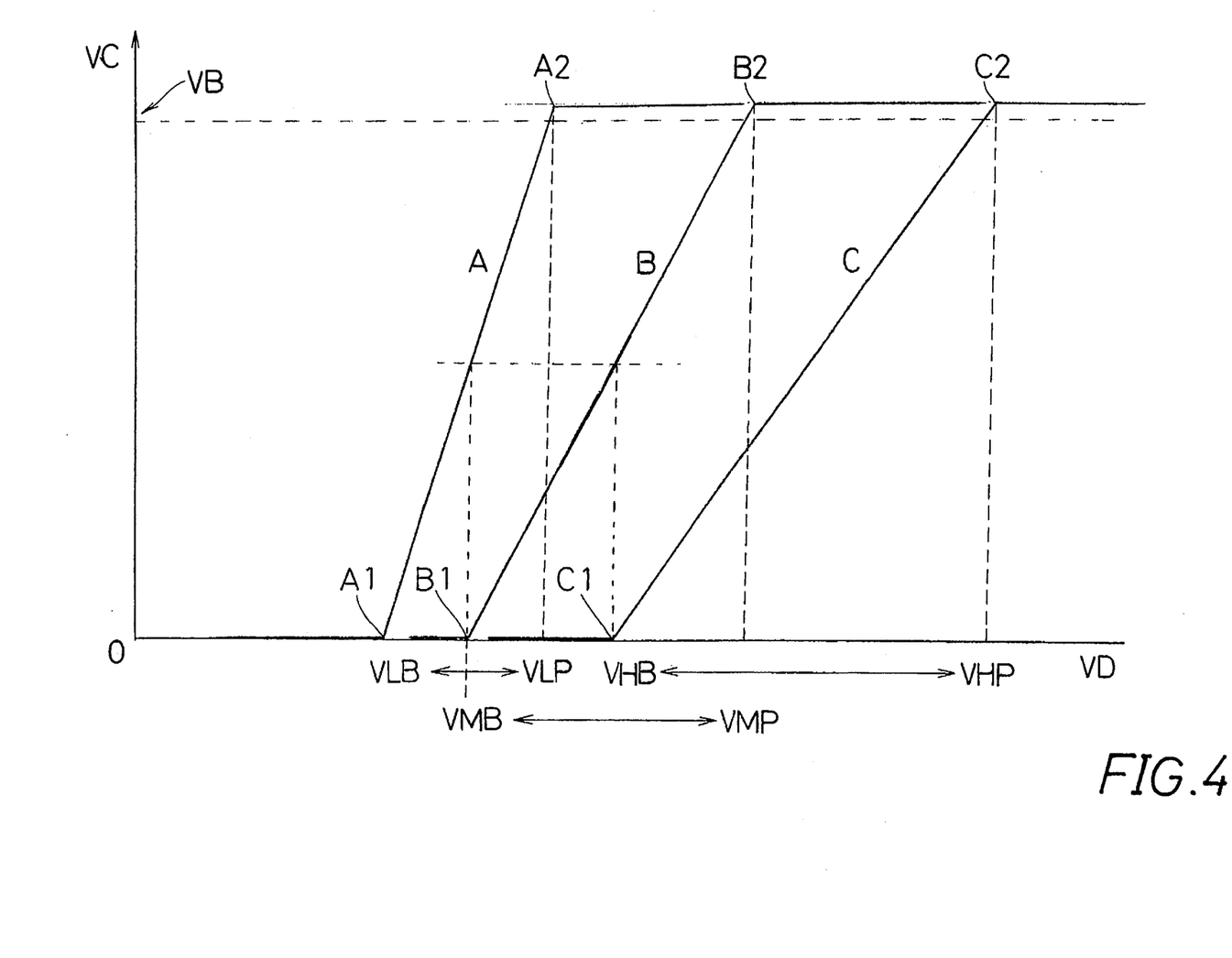
FIG. 4 is a graph showing various characteristic lines obtained by the circuit of FIG. 1.

The characteristic line A is obtained when all of the output ports PO1 to PO4 are turned off. In this case, the battery voltage at which the divided voltage VC is varied from zero (the battery voltage at a point A1) is (1+ RE/RA1) times as the base voltage VB in addition the voltage drop VBE between the base and the emitter. Further, the inclination of the line A is RC1/RE.

The characteristic line B represents the characteristic obtained when the output ports PO1 and PO3 are turned on while the output ports PO2 and PO4 are turned off. In this case, a dividing resistance on the other side of the voltage-dividing resistor RE is provided as a combined resistance of the voltage-dividing resistors RC1 and RC2 connected parallel to each other. The combined divisional resistance is lower than the value of the voltage-dividing resistor RC1, so that the line B has a relatively gentle inclination. On the other hand, a bypass resistance is provided as a combined resistance of the bypass resistors RA1 and RA2 connected parallel to each other. The combined bypass resistance is lower than the value of the bypass resistor RA1. Accordingly, in this case, the battery voltage at which the divided voltage VC is varied from zero (the battery voltage at a point B1) is greater than the value which results from the case of the line A.

The characteristic line C in FIG. 4 represents the characteristic obtained when the output ports PO1 and PO3 are turned off while the output ports PO2 and PO4 are turned on. In this case, the divided resistance is provided as a combined resistance of the voltage-dividing resistors RC1 and RC3 connected parallel to each other. On the other hand, the bypass resistance is provided as a combined resistance of the bypass resistors RA1 and RA3 connected parallel to each other. The divided voltage VC is varied from zero at a point C1.

In FIG. 4, points A2, B2 and C2 represent timings when the divided voltage VC becomes maximum in case of the lines A, B and C, respectively.

With the embodiment of FIG. 1, a fourth characteristic line may be obtained when all of the output ports PO1 to PO4 are turned on.

As shown in FIG. 4, the point A1 of the line A is adjusted to correspond to VLB in FIG. 5, and the point A2 to VLP in FIG. 5. The point B1 of the line B is adjusted to correspond to VMB in FIG. 5, and the point B2 to VMP in FIG. 5. The point C1 of the line C is adjusted to correspond to VHB in FIG. 5, and the point C2 to VHP in FIG. 5. Thus, the lines A, B and C are determined to be suitable for the batteries having the lower rating voltage, the middle rating voltage and the higher rating voltage, respectively. Further, the battery voltage at the point B1 is determined to have an average value of the voltages at the points A1 and A2, while the battery voltage at the point C1 is determined to have an average value of the voltages at the points B1 and B2.

The one-chip microcomputer 40 stores a further program for performing the following steps:

(1) Turning off all the output ports PO1 to PO4 when the charging operation is to be started.
(2) Performing the previously described steps to control the charging current during the charging operation so as to maintain the charging current I at a constant value.
(3) Receiving a signal concerning the battery voltage VB from the input port PIAD when a predetermined time has elapsed after starting the charging operation.
(4) Detecting the divided voltage VC (the divided voltage VC detected in this stage varies according to the characteristic line A in FIG. 4 since the output ports PO1 to PO4 are turned off in the step (1)).
(5) Continuing the charging operation with the output ports PO1 to PO4 held off if the detected divided voltage VC is less than ½ times as VB, and monitoring the battery voltage based on the characteristic line A in FIG. 4. (This case is applied to the charging operation of the battery having the lower rating voltage.)
(6) Turning on the output ports PO1 and PO3 with the output ports PO2 and PO4 held off so as to provide the characteristic line B of FIG. 4 when the detected divided voltage VC in the step (4) is equal to or more than ½ times as VB.
(7) Continuing the charging operation with the characteristic line B held to be obtained, and monitoring the battery voltage when the divided voltage VC detected after changing of the characteristic line from A to B is less than ½ times as VB. (This case is applied to the charging operation of the battery having the middle rating voltage.)
(8) Turning off the output ports PO1 and PO3 and turning on the output ports PO2 and PO4 so as to provide the characteristic line C in FIG. 4 when the detected divided voltage VC in step (6) is equal to or more than ½ times as VB. (This case is applied to the charging operation of the battery having the higher rating voltage.)
(9) Monitoring the battery voltage based on the characteristic line C during the charging operation in case of (8).
(10) Detecting the timing of change by a value of $-\Delta V$ from a peak voltage monitored at each of the steps (5), (7) and (9), and stopping a further firing operations of the thyristors 14 and 16 so as to stop charging of the battery.

During the steps of (5), (7) and (9), the batteries having the lower rating voltage, the middle rating voltage and the higher rating voltage are monitored by the characteristic lines A, B and C, respectively, so that the divided voltage VC has substantially the same value irrespective of change of the rating voltage. Therefore, $-\Delta V$ may have a uniform value, and the timing of full charging of the battery can be reliably detected irrespective of change of the rating voltage.

Additionally, the microcomputer 40 is programmed to determine whether the divided voltage VC is zero when the battery BP is set to the battery charger. When the battery BP is shorted, the divided voltage VC may have a value of zero irrespective of the type of the characteristic line, so that the operation of charging the shorted battery can be reliably inhibited.

While the invention has been described with reference to a preferred embodiment, it is to be understood that modifications or variation may be easily made without departing from the spirit of this invention which is defined by the appended claims.

What is claimed is:

1. A battery charger comprising a battery voltage detecting circuit for detecting a voltage of a battery during a charging operation, said battery voltage detecting circuit including a pair of a first and a second voltage-dividing resistor, and a transistor interposed between said first and second voltage-dividing resistors, the base of said transistor being applied by a predetermined voltage, so that the battery voltage is detected based on the voltage divided by said first and second voltage-dividing resistors.

2. The battery charger as defined in claim 1 further including a bypass resistor connected between an earthing line and a connecting point at which said transistor is connected to said first voltage-dividing resistor, said bypass resistor bypassing said transistor and said second dividing resistor.

3. The battery charger as defined in claim 2 wherein said bypass resistor includes a plurality of bypass resistor elements connected parallel to each other, and further including a first switch interposed between each of said bypass resistor elements and said earthing line.

4. The battery charger as defined in claim 1 wherein said second resistor is connected between said transistor and earthing line and includes a plurality of second resistor elements connected parallel to each other, and further including a second switch connected between each of said second resistor elements and said earthing line.

* * * * *

UNITED STATES PATENT AND TRADEMARK OFFICE
CERTIFICATE OF CORRECTION

PATENT NO. : 5,453,677
DATED : September 26, 1995
INVENTOR(S) : Masahiko SAKOH and Tatsuki MORI It is certified that error appears in the above-indentified patent and that said Letters Patent is hereby corrected as shown below:

Column 10, line 4, after "and" insert --an--.

Signed and Sealed this

Twenty-eighth Day of November 1995

Attest:

BRUCE LEHMAN

Attesting Officer        Commissioner of Patents and Trademarks